United States Patent Office 3,008,928
Patented Nov. 14, 1961

3,008,928
USE OF SULFONAMIDES TO ACCELERATE ESTERIFICATION AND POLYCONDENSATION REACTIONS IN THE MANUFACTURE OF POLYESTER AND ALKYD RESINS
Walter H. C. Rueggeberg, Wilmington, Del., assignor to Tennessee Corporation, New York, N.Y., a corporation of New York
No Drawing. Filed July 3, 1958, Ser. No. 746,324
11 Claims. (Cl. 260—75)

This invention relates to the preparation of resins of the polyester and/or alkyd type and to the resulting products. This application is a continuation-in-part of my prior application Serial No. 651,158, filed April 8, 1957.

Resins of the above named types comprise polycondensation products of reaction between polycarboxy acids or derivatives thereof and polyhydroxy compounds. Various known products of this type are used as resins or plastics in paints and varnishes, as materials of construction, and for various other purposes. In general, they are prepared by reaction between a dicarboxylic acid or its anhydride and a dihydric or polyhydric alcohol, or by ester interchange between esters of such an acid and the particular polyhydroxy compound or compounds employed. The resulting polycondensation products vary considerably in their properties, depending on the particular dicarboxylic acid and the particular polyhydroxy compound employed. Furthermore, the characteristic properties of any given polycondensation product may be materially altered by the addition of suitable modifiers, such as monocarboxylic acids, monohydroxy alcohols, small amounts of polycarboxylic acids or polyhydroxy alcohols, "drying oil" fatty acids, etc. For example, the so-called alkyd resins which are used principally in paints and varnishes almost always contain drying oil fatty acids as modifiers, as in the case of known resins prepared by the reaction of isophthalic acid with glycerol and a drying oil fatty acid, or with the reaction product of glycerol and the glyceride of a drying oil fatty acid. Such resins are cross-linked by condensation at the double bonds of the unsaturated drying oil fatty acids. Other polycondensation products not containing drying oil fatty acids are sometimes called polyesters in differentiation from the alkyds. According to the Condensed Chemical Dictionary, 5th Ed. (1956), the term "alkyd" is usually reserved for saturated esters that polymerize by means of the esterification reaction, while the term "polyester" is applied more specifically to the unsaturated esters such as esters of maleic acid, the allyl resins, etc.

The class of materials described above, including both polyesters and alkyds, may be described generically as polycondensation products of polyfunctional alcohols and polycarboxylic acids or their derivatives such as esters and anhydrides. For purposes of the present invention, any desired polyfunctional alcohol can be used, illustrative examples being glycerol, polyglycerol, pentaerythritol, mannitol, sorbitol, ethylene glycol, propylene glycol, condensates of such glycols with ethylene oxide, etc. The polycarboxylic acid, however, is an aromatic polycarboxylic acid (or derivative thereof) such as the phthalic acids, and especially isophthalic acid and phthalic anhydride as set forth below.

Esterification reactions of the above types generally have the disadvantage that they are quite slow, and this is true particularly in the case of isophthalic acid which esterifies very slowly, even at high temperatures. In many cases, moreover, it is undesirable to speed the reaction by increasing the temperature because of the increased risk of decomposition of the reactants and/or the reaction product. Thus the capital investment required for a plant to produce such compounds is high and resort has been had to the use of various catalysts to decrease the reaction time. For example, U.S. Patent No. 2,675,367 specifies the use of zinc chloride as a catalyst for the esterification, and U.S. Patent No. 2,720,502 specifies the use of organometallic compounds having the formula $MHTi(OR)_6$, where M is lithium, sodium, or potassium and R is an inorganic compound containing from 1 to 6 carbon atoms, and also of Grignard reagents. U.S. Patent No. 2,720,505 specifies the use of tetraethyl lead. All of these catalysts increase the rate of reaction, but also they remain in the product as undesirable metallic contaminants that may cause dark colors and/or organic contaminants that may decompose in use with resultant failure of coatings or castings.

It has been found that the rate of the esterification reaction of isophthalic acid and/or its derivatives and of phthalic anhydride with polyfunctional alcohols can be markedly increased by adding to the reaction mono- and/or dicarboxybenzenesulfonamides or their N-substituted derivatives. Moreover, this advantage is realized without the undesirable contamination of the product which accompanies the use of catalysts such as those named above, because the added carboxybenzenesulfonamide reacts with and becomes a constituent of the polymeric molecule as set forth in greater detail below.

It is believed that the increased reaction rate mentioned above results from the presence of the sulfonamide group, for the reason that its acidity is greater than that of isophthalic acid. This increased acidity is illustrated in the case of a number of carboxybenzenesulfonamides by the following table of pK values:

TABLE I

Dissociation constants of isophthalic acids

| Acid | Sample Code | pK$_1$ | pK$_2$ | Purity by Titration, Percent |
|---|---|---|---|---|
| 3,5-Dicarboxybenzenesulfonamide | | 3.9 | 4.9 | 99.6 |
| 3,5 - Dicarboxybenzene-N-ethylsulfonamide | DBES | 3.8 | 4.8 | 99.6 |
| 3,5 - Dicarboxybenzene - N,N - diethylsulfonamide | | 4.0 | 5.0 | 99.4 |
| 3,5 - Dicarboxybenzene - N - n - butylsulfonamide | DBBS | 4.0 | 5.0 | 99.7 |
| 3,5 - Dicarboxybenzene - N,N - di-n-butylsulfonamide | | 4.1 | 5.1 | 99.2 |
| 3,5 - Dicarboxybenzene - N - cyclohexylsulfonamide | | 4.0 | 5.0 | 99.5 |
| 3,5 - Dicarboxybenzenesulfonmorpholide | | 3.8 | 4.9 | 99.8 |
| 3,5 - Dicarboxybenzene - N-2-ethylhexylsulfonamide | DBOS | 4.1 | 5.1 | 99.1 |
| Isophthalic acid | | 4.6 | 5.6 | 97.7 |

The mono- and dicarboxybenzenesulfonamides useful for the purposes of the present invention may be defined by the following formula:

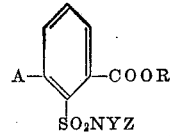

where A is hydrogen or a second COOR group; where R is hydrogen or a desired alkyl group such as methyl, ethyl, or any of the lower alkyl groups up to say 8 carbon atoms and where Y and Z may be hydrogen, hydroxyl or desired substituents on the nitrogen atom derived from primary or secondary aliphatic, alicyclic, or aromatic amines, or members of mono-hetero or polyhetero rings containing a nitrogen atom bonded to the sulfonyl group. In addition to those listed above in Table I, sulfonamides useful for the purposes of the present invention can be obtained by condensing 3,5-dicarboxybenzenesulfonyl halides under appropriate conditions with primary and secondary amines such as methylamine, dimethylamine, isopropylamine, di-isopropylamine, neopentylamine, di-(2-methylpropyl)amine, allylamine, diallylamine, glycine, α- and β-alanine, benzylamine, methylbenzylamine, N-benzylmethylamine, N-phenylbenzylamine, dibenzylamine, 2-ethylhexylamine, di-2-ethylhexylamine, n-dodecylamine, n-octadecylamine, aniline and various substituted anilines such as the haloanilines, toluidines, xylidines, anisidines, and the like, N-methylaniline, pyrrolidine, piperidine, 3-methoxypropylamine, monoethanolamine, diethanolamine, diaminoethylpropanol, monopropanolamine, N-phenylethanolamine, di-2-hydroxypropylamine, naphthylamines and similar compounds. Mono-carboxybenzenesulfonamides can be similarly prepared by condensing m-carboxybenzenesulfonyl halide with amines as set forth above, as in the cases of m-carboxybenzene-N-ethylsulfonamide (CBES), m-carboxybenzene-N-butylsulfonamide (CBBS) and the like. Similar p-carboxybenzenesulfonamides are obtained by the oxidation of toluenesulfonamide.

The two carboxyl groups of the dicarboxybenzenesulfonamides correspond to those of isophthalic acid and react with polyfunctional alcohols in the same way, being thus incorporated in the polymeric molecule in replacement of some of the isophthalic acid. Even a very small amount of the sulfonamide has an appreciable effect in decreasing the reaction time, and this effect increases as the amount of sulfonamide is increased. For example, as little as 0.1 mole sulfonamide per mole of isophthalic acid may reduce the reaction time by nearly one half, as illustrated by the examples set forth hereinafter. On the other hand, it will be evident that the isophthalic acid can be completely replaced by sulfonamide if desired, with a correspondingly greater reduction of reaction time to as little as one third the time required for isophthalic acid alone. Thus in the reaction of ethylene glycol with isophthalic acid at 190–200° C., as much as 14 or more hours may be required to reach an acid number of 25, whereas the incorporation of a small amount of DBES reduces the reaction time to 7.5 hours and the complete replacement of isophthalic acid with DBES reduces it to 3.5 hours. In any event, the total number of esterifiable carboxyl groups of the isophthalic acid and the sulfonamide should not exceed substantially the total number of esterifiable alcoholic hydroxyl groups. When equimolar quantities are used, the molecular weight of the resin may be very high. If excess alcohol is used, however, the molecular weight will be lower and such products are used as plasticizers, adhesives, etc.

Isophthalicsulfonamides may also be used to decrease the temperature required to carry out a reaction in a given time. This is advantageous in cases where high temperatures may cause decomposition of the reactants or products. For example, in the preparation of alkyd resins, the use of DBES (see Table I) resulted in an acid number of 9 after 1 hour at 200–230° C., while an acid number of 54 was reached after 5 hours at 235–250° C. when DBES was not used.

Another advantage resulting from the use of isophthalicsulfonamides is the fact that these sulfonamides are less volatile than the phthalic acids. Orthophthalic acid sublimes at a temperature of less than 284.5° C., while terephthalic acid sublimes at a temperature of somewhat more than 300° C. Sublimation is a very undesirable characteristic of these compounds in reactions to form polyesters, and results in loss of the reagent, increase in process equipment, and/or difficulty in controlling the reaction. The sulfonamides mentioned above melt at above 200° C. and are not volatile.

In some cases it may be desirable to form the resinous material by known transesterification procedures, using the methyl, ethyl or other lower alkyl ester of isophthalicsulfonamide and effecting ester interchange with the desired polyhydroxy compound such as those mentioned above as examples.

Monocarboxybenzenesulfonamides such as m-carboxybenzenesulfonamide (benzoic sulfonamide) contain only one carboxyl group and hence cannot form polymers with polyfunctional alcohols, but the carboxyl groups are esterified with alcoholic hydroxyl groups other than those esterified with the isophthalic acid so that the sulfonamide becomes a constituent of the polymeric molecule. In such cases the polyfunctional alcohol preferably has at least three esterifiable hydroxyl groups, and the amount of monocarboxybenzenesulfonamide is preferably no greater than that equivalent to the free hydroxyl groups. At the same time, the monocarboxybenzenesulfonamide has a catalytic effect in hastening the rate of reaction comparable to the effect of the isophthalicsulfonamides discussed above.

In most cases it is advantageous to carry out the esterification reaction in the absence of oxygen by the use of a blanket of suitable inert gas such as carbon dioxide or nitrogen. Also any water formed during the reaction may be removed as it is formed by any suitable means such as distillation. The point at which the reaction should be terminated can be ascertained by determining the reduction in acid number, a terminal value of about 10–30 being suitable in most cases. Other details of procedure are shown by the following examples which illustrate the practice of the invention.

EXAMPLE I

A resin was made by heating .82 mole of ethylene glycol and .75 mole of isophthalic acid in a 300 ml. round-bottomed flask equipped with a heating mantle, thermometer, agitator and gas inlet tube extending to the surface of the mixture, through which $CO_2$ was passed. These reagents were heated for 14 hours at a temperature of 185–195° C., at which time the product had an acid number of 25. When 0.075 mole of DBBS (see Table I) was substituted for 0.075 mole of isophthalic acid in the above reaction, an acid number of 25 was reached after 7.5 hours. When 0.10 mole of DBES (see Table I) was substituted for 0.10 mole of isophthalic acid, an acid number of 25 was reached in 12 hours. When DBES alone was used without isophthalic acid, an acid number of 26 was reached in 3.5 hours.

EXAMPLE II

A resin was made by heating .210 mole of glycerol, .174 mole of isophthalic acid and .228 mole of Emersol 9305 fatty acid (a mixture of oleic and linoleic acids with small amonts of linolenic acid and saturated acids) in a 250 ml. round-bottomed flask equipped with a heating mantle, therermometer and gas inlet tube extending to the surface of the mixture. The reagents were raised to a temperature of 235° C. during a period of 2 hours and were heated at 240–265° C. for 5.5 hours. $CO_2$ was passed over the surface of the mixture as before. At the end of this time the acid number was 54. When .058 mole of DBES was substituted for .058 mole of the isophthalic acid, the acid number reached 9 after the temperature of the reagents had been raised to 230°

C. over a period of two hours and subsequently heated to 200–230° C. for one hour. In this example a lower acid number is obtained by use of DBES under the same conditions as were employed for isophthalic acid.

EXAMPLE III 43.5 grams (.294 mole) of phthalic anhydride, 0.9 gram (.009 mole) of fumaric acid, 48.0 grams (.241 mole) of linseed fatty acid and 29.0 grams (.316 mole) of glycerol were heated in a 250 ml. round-bottomed flask equipped with a heating mantle, thermometer, agitator and gas inlet tube extending to the surface of the mixture. $CO_2$ was passed over the surface during the reaction. These reagents were brought to a temperature of 250° C. over a period of 2 hours and were held at this temperature for ½ hour. At the end of this time the acid number of the product was 5. When .294 mole of phthalic anhydride, .009 of fumaric acid, .185 of linseed fatty acids and .056 mole (12.8 grams) of CBES (see Table I) were brought to a temperature of 175° C. over a period of 1½ hours, and were maintained at a temperature of 175–185° C. over a period of 3 hours, the acid number of the product was 10.

This shows that when CBES is used in the preparation of alkyd resins, a low acid number can be obtained at a lower temperature than would be required for the preparation of an alkyd without CBES.

Enamels were made from these resins, and steel panels coated with these enamels were tested in the Weather-O-Meter for 100 hours. At the end of this time, all these samples were flexible enough to pass the conical mandril bending test. Weather had no deleterious effect on the film.

EXAMPLE IV 28.9 grams (.174 mole) of isophthalic acid, 19.3 grams (.210 mole) of glycerol and 63.6 grams (.228 mole) of Emersol 9305 fatty acid were heated in a round-bottomed flask, equipped with a heating mantle, thermometer, agitator and gas inlet tube extending to the surface of the mixture. The temperature was raised to 240° C. over a period of 2 hours and was held at 240–265° C. for 5.5 hours. $CO_2$ was passed over the surface of the reactants. At the end of this time, the acid number of the product had reached 54. When 15.8 grams (.058 mole) of DBES were substituted for .058 mole of isophthalic acid, the acid number reached 9 after the reagents had been brought to 230° C. over a period of 2 hours and had been maintained at a temperature of 200–230° C. for one hour. This example shows that DBES may be substituted for isophthalic acid in alkyd resins. The resin containing DBES was heated for a shorter period of time, and reached a lower acid number at a lower temperature.

The resins described above were used to prepare enamels containing 50 grams of alkyd, 25 grams of $TiO_2$ and 0.3 gram of 6% copper naphthenate. These enamels were painted on aluminum, dried at room temperature and also at 150° C., and exposed on the roof during the month of April. The effect of weathering was to bleach the enamel. The gloss was retained, and all samples passed the conical mandril bending test.

EXAMPLE V 37.6 grams (0.25 mole) of phthalic anhydride, .78 gram (.0067 mole) of fumaric acid, 28.7 grams of Emery Soya acid, 7.6 grams (.043 mole) of p-t-butyl benzoic acid catalyst, and 28.2 grams (.307 mole) of glycerol were heated in a round-bottomed flask equipped with a heating mantle, agitator, thermometer, and gas inlet tube extending to the surface of the mixture. $CO_2$ was passed over the surface of the mixture during the reaction. These reagents were heated at a temperature of 250° C. for a period of 2 hours at which time the acid number was 10.

36.6 grams (.25 mole) of phthalic anhydride, .76 gram (.0066 mole) of fumaric acid, 35.9 grams of Emery Soya acid, 24.5 grams (.267 mole) of glycerol, and 2.92 grams (.012 mole) of CBES were heated in a round-bottomed flask equipped with a mantle, agitator, thermometer and gas inlet tube extending to the surface of the mixture. $CO_2$ was passed over the surface of the mixture. After heating at 252° C. for a period of 4.75 hours the acid number was 15.

Enamels were made from these alkyds by mixing in $TiO_2$ (100% of resin weight) and cobalt naphthenate (0.05% cobalt based on resin weight). These enamels were painted on aluminum panels and exposed for 200 hours in the Weather-O-Meter. There was no effect on gloss and all samples were flexible enough after weathering to pass the bending test. This example shows that CBES is effective as a catalyst for the esterification reaction as well as p-t-butyl benzoic acid.

EXAMPLE VI 19.3 grams (.116 mole) of isophthalic acid, 19.3 grams (.210 mole) of glycerol, 63.6 grams (.228 mole) of Emersol 9305 fatty acid and 17.4 grams (0.058 mole) of DBBS were heated in a round-bottomed flask equipped with a heating mantle, agitator, thermometer, and gas inlet tube extending to the surface of the mixture. $CO_2$ was passed over the surface as before. The reagents were brought to a temperature of 200° C. over a period of 1.5 hours, were maintained at a temperature of 190–215° C. for a period of 3 hours, and were held at a temperature of 230° for 1.5 hours. At the end of this time the acid number was 26. When this experiment was carried out with the use of 0.058 mole additional isophthalic acid in place of the 0.058 mole of DBBS the acid number was 54 after the reagent had been heated for 4 hours at temperatures of 235° to 250° C.

EXAMPLE VII 125 grams (0.75 mole) of isophthalic acid and 51 grams (0.82 mole) of ethylene glycol were heated in a round-bottomed flask equipped with a heating mantle, agitator, thermometer and gas inlet tube. $CO_2$ was passed over the surface of the mixture. After heating at a temperature of 185–190° C. for a period of 10.5 hours, the acid number reached 82. When 58 grams (0.16 mole) of DBOS (3,5-dicarboxybenzene-N - 2 - ethylhexylsulfonamide) was substituted for 0.16 mole of isophthalic acid in the above mixture, the acid number reached 82 after only 8.5 hours.

EXAMPLE VIII 100 grams (0.105 mole) of Archer-Daniels-Midland Superb Soya Oil and 18.5 grams glycerol (0.20 mole) were heated in a resin flask equipped with a heating mantle, agitator, thermometer, steam condenser and gas inlet tube. $CO_2$ was passed over the surface. The temperature was raised over a 2.5 hour period to 232° C. and held for 40 minutes. The temperature was then reduced to 204° C. and 43.5 grams (0.26 mole) of isophthalic acid added. Subsequent heating at 260° C. for 3 hours achieved an acid number of 3.8. When 47.6 grams (0.13 mole) of DBOS (3,5-dicarboxybenzene-N-2-ethylhexysulfonamide) was substituted for 0.13 mole of isophthalic acid, only 50 minutes' heating at 260° C. were required to reach an acid number of 3.7.

Certain of the alkyd resins listed in the above examples were thinned with mineral spirits to 50% solids. Lead naphthenate (0.3%) and cobalt naphthenate (0.03%) were added as driers. Standard ASTM steel panels were flow-coated with the alkyd varnishes. The panels were placed in a room maintained at 77° F. and 50% relative humidity. Drying time, surface hardness, impact resistance, flexibility, and resistance to dilute NaOH and boiling water were studied. These tests were carried out according to methods given in "Physical and Chemical Examination of Paints, Varnishes, Lacquers and Colors," issued by the Gardner Laboratories. The results are given in the following table:

*Film properties*

| Resin | Percent Solids | Gardner-Holdt Viscosity | Drying Time (Hrs.) | | Film Thickness (Mils) | Surface Hardness | Flexibility | Impact Resist. | Resistance to— | |
|---|---|---|---|---|---|---|---|---|---|---|
| | | | Set-to-Touch | Tack-Free | | | | | Boil. H₂O | Dil. NaOH |
| Reference IPA | 50 | A-E | 1 | 3 | .5-1.0 | 16 | Passed | Passed 160. | E | P |
| Ex. VIII | 51.7 | L | 168 | | | | | | | |
| DBBS¹ | 41.2 | I | | | | | | | | |

¹ Prepared from carboxylic acids similar to those used in Example VI, but containing only 25% DBBS instead of 33%.

It is to be understood that resins embodying the invention are useful in general for the same purposes for which the corresponding polyester and alkyd resins have been used or are suitable, including many useful applications in paints, varnishes and baking enamels, as materials of construction, etc.

It will be understood, of course, that the invention is not restricted to the foregoing detailed examples, as will be evident to those skilled in the art. Also any of the various modifiers known to the art can be employed, as well as many other drying oil fatty acids. Again the term "esterification" as used in the appended claims is intended to include both a direct reaction between carboxy and hydroxy groups and a corresponding transesterification reaction. Reference should, therefore, be had to the appended claims for a definition of the limits of the invention.

What is claimed is:

1. In the manufacture of polyester and alkyd resins by esterification and polycondensation of dicarboxylic material with polyfunctional aliphatic alcohols free of functional groups other than alcoholic hydroxyl, the steps of heating said alcohol and said dicarboxylic material at a temperature between about 175° C. and 265° C. to react the hydroxyl and carboxyl groups with resultant esterification and polycondensation, said dicarboxylic material selected from the group consisting of a sulfonamide, mixtures thereof with 1,3-dicarboxybenzene, and mixtures thereof with the anhydride of 1,2-dicarboxybenzene, said sulfonamide having the formula

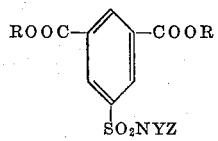

where R is selected from the group consisting of hydrogen and alkyl groups contining 1–8 carbon atoms; where —NYZ stands for a compound containing nitrogen bonded to the sulfonyl group and selected from the group consisting of heterocyclic compounds containing nitrogen and primary and secondary amines in which Y and Z are members of the group consisting of hydrogen, hydroxyl, and alkyl, aryl, and cycloparaffin groups, the mole ratio of total alcohol to total dicarboxylic material being in the approximate range of 1:1 to 1.2:1.0 and the sulfonamide being in the approximate range from 10 mole percent up to 100 mole percent of the total dicarboxylic material.

2. In the production of polyester and alkyd resinous materials by esterification and polycondensation of dicarboxylic material with polyfunctional aliphatic alcohol free of functional groups other than alcoholic hydroxyl, the step of heating said alcohol with a substantially equimolar quantity of a 3,5-dicarboxybenzenesulfonamide at a temperature between about 175° C. and 265° C. to react the hydroxyl and carboxyl groups with resultant esterification and polycondensation.

3. In the production of polyester and alkyd resinous materials by esterification and polycondensation of dicarboxylic material with polyfunctional aliphatic alcohol free of functional groups other than alcoholic hydroxyl, the step of heating said alcohol with a dicarboxylic material comprising a mixture of 3,5 - dicarboxybenzenesulfonamide and 1,3-dicarboxybenzene at a temperature between about 175° C. and 265° C. to react the hydroxyl and carboxyl groups with resultant esterification and polycondensation, the mole ratio of total alcohol to total dicarboxylic material being in the approximate range of 1:1 to 1.2:1.0 and the sulfonamide being in the approximate range from 10 mole percent up to about 50 mole percent of the total dicarboxylic material.

4. The method of accelerating the rate of esterification of isophthalic acid by a polyfunctional alcohol free of functional groups other than alcoholic hydroxyl in the manufacture of polyester and alkyd resinous materials which comprises esterifying said acid with said alcohol by heating a mixture thereof in the presence of a sulfonamide accelerating agent having the formula set forth in claim 1 to a temperature between about 175° C. and 265° C. to react the hydroxyl and carboxyl groups with resultant esterification and polycondensation, said sulfonamide being in the approximate range from 10 mole percent up to about 50 mole percent of the isophthalic acid and the mole ratio of total alcohol to total dicarboxylic material being in the approximate range of 1:1 to 1.2:1.0.

5. Resinous polyester and alkyd materials comprising the polycondensation reaction products of polyfunctional aliphatic alcohols free of functional groups other than alcoholic hydroxyl with isophthalic acid and a sulfonamide having the formula set forth in claim 1, the carboxyl groups both of said isophthalic acid and of said sulfonamide being esterified by said alcohol by heating the reaction mixture to a temperature between about 175° C. and 265° C., said sulfonamide being in the approximate range of 10 mole percent up to 50 mole percent of the total dicarboxylic material and the mole ratio of total alcohol to total dicarboxylic material being in the approximate range of 1:1 to 1.2:1.0.

6. Resinous materials as defined in claim 5 said sulfonamide being 3,5-dicarboxybenzenesulfonamide.

7. Resinous materials as defined in claim 5 said sulfonamide being N-2-ethylhexyl-3,5-dicarboxybenzenesulfonamide.

8. Resinous materials as defined in claim 5, said sulfonamide being 3,5 - dicarboxybenzene-N-n-butylsulfonamide.

9. A process as defined in claim 1, said sulfonamide being N-2-ethylhexyl-3,5-dicarboxybenzenesulfonamide.

10. A process as defined in claim 1, said sulfonamide being 3,5-dicarboxybenzene-N-n-butylsulfonamide.

11. Resinous polyester and alkyd materials comprising the polycondensation reaction products of polyfunctional aliphatic alcohols free of functional groups other than alcoholic hydroxyl and a substantially equimolar quantity of a 3,5-dicarboxybenzenesulfonamide, said materials being produced by the method defined in claim 2.

References Cited in the file of this patent

UNITED STATES PATENTS

| | | |
|---|---|---|
| 1,935,264 | Felix et al. | Nov. 14, 1933 |
| 2,138,934 | Moss | Dec. 8, 1938 |

FOREIGN PATENTS

| | | |
|---|---|---|
| 5,135 1895 | Great Britain | Jan. 11, 1896 |